(12) United States Patent
Yamada

(10) Patent No.: US 7,542,159 B2
(45) Date of Patent: Jun. 2, 2009

(54) IMAGE FORMING DEVICE AND NETWORK SYSTEM

(75) Inventor: Akihiro Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 846 days.

(21) Appl. No.: 10/631,784

(22) Filed: Aug. 1, 2003

(65) Prior Publication Data

US 2004/0024744 A1      Feb. 5, 2004

(30) Foreign Application Priority Data

Aug. 5, 2002    (JP)    ............................. 2002-227305

(51) Int. Cl.
    *G06F 7/00*    (2006.01)
(52) U.S. Cl. .......................... 358/1.15; 707/1; 358/1.13
(58) Field of Classification Search ................ 358/1.15, 358/1.3, 1.9, 1.14, 468, 1.5, 1.12, 471, 402, 358/450, 1.13; 709/203; 707/1; 395/335; 399/79

See application file for complete search history.

(56) References Cited

U.S. PATENT DOCUMENTS

| | | | | | |
|---|---|---|---|---|---|
| 5,687,332 | A | * | 11/1997 | Kurahashi et al. | ........... 715/706 |
| 5,751,922 | A | | 5/1998 | Harada | |
| 5,845,076 | A | * | 12/1998 | Arakawa | ................... 709/203 |
| 6,473,800 | B1 | * | 10/2002 | Jerger et al. | ................. 709/226 |
| 6,498,611 | B1 | * | 12/2002 | Beard et al. | ................. 715/752 |
| 6,618,566 | B2 | * | 9/2003 | Kujirai et al. | ................. 399/79 |
| 6,628,417 | B1 | * | 9/2003 | Naito et al. | ................. 358/1.15 |
| 6,732,090 | B2 | * | 5/2004 | Shanahan et al. | ............... 707/3 |
| 6,775,023 | B1 | * | 8/2004 | Fukunaga et al. | .......... 358/1.15 |
| 6,886,028 | B1 | * | 4/2005 | Matsuyama et al. | ......... 709/203 |
| 7,046,385 | B2 | * | 5/2006 | Mori et al. | ................. 358/1.15 |
| 7,145,673 | B1 | * | 12/2006 | Lin | ............................ 358/1.15 |
| 7,173,718 | B2 | * | 2/2007 | Iwata et al. | ................. 358/1.13 |
| 7,180,618 | B2 | * | 2/2007 | Ueda et al. | ................. 358/1.15 |
| 2003/0035144 | A1 | * | 2/2003 | Shima | ....................... 358/1.18 |

FOREIGN PATENT DOCUMENTS

| | | |
|---|---|---|
| JP | A-06-149490 | 5/1994 |
| JP | A 06-214862 | 8/1994 |
| JP | A 08-320781 | 12/1996 |
| JP | A-09-104151 | 4/1997 |
| JP | A 10-315587 | 12/1998 |
| JP | A 11-275279 | 10/1999 |

(Continued)

*Primary Examiner*—King Y Poon
*Assistant Examiner*—Allen H Nguyen
(74) *Attorney, Agent, or Firm*—Oliff & Berridge, PLC

(57) ABSTRACT

When the printer 10 receives a request signal from one of the administrative computer G and the computers 20 indicating that the user has used the mouse 53 to click the "Edit" button displayed on the CRT monitor 55 (S4), then the printer 10 transmits data for the edit wizard 201 for modifying setting items displayed in the print function settings wizard 202 to the administrative computer G or the computer 20 corresponding to the ID data set attached to the request signal. The user uses the mouse 53 to click on either "Display on" or "Display off" next to each setting item in the edit wizard 201 displayed on the CRT monitor 55 (S6), enabling the user to re-edit setting items displayed in the print function settings wizard 202 (S7-S13).

14 Claims, 8 Drawing Sheets

FOREIGN PATENT DOCUMENTS

| | | |
|---|---|---|
| JP | A 2001-166907 | 6/2001 |
| JP | A 2001-175448 | 6/2001 |
| JP | A 2001-225531 | 8/2001 |
| JP | A 2001-285534 | 10/2001 |
| JP | A-2003-150971 | 5/2003 |

* cited by examiner

IMAGE FORMING DEVICE AND NETWORK SYSTEM

BACKGROUND OF THE INVENTION

1. Field of the Invention

The present invention relates to an image forming device connected to a network system.

2. Description of Related Art

Image forming devices such as laser printers that are connected to a network store setting items such as printing conditions and their setting values in a Hypertext format as display data. A browser program can display this display data on a display unit of the image forming device as a settings window or a settings screen. In a printing device disclosed in Japanese unexamined patent application publication No. 2001-166907, for example, Hypertext display data stored in the printing device is transferred to a personal computer connected to the printing device via a network. By so doing, a browser program provided on the personal computer can display the display data of the printing device in a display unit of the personal computer as a settings window.

By overwriting the Hypertext content (display data) using an editor program or the like on the personal computer, a user can modify setting items for the printing conditions and the like in the settings window that is displayed based on the display data and the order in which setting items are displayed. After modifications are completed, the Hypertext is transmitted back to the printing device. In this way, it is possible to modify the order in which setting items are displayed on the printing device.

The printing device described in Japanese unexamined patent application publication No. 2001-166907 provides setting items or setting values for various functions, printing conditions, and the like of the printing device to a personal computer in the form of Hypertext display data that can be displayed in a settings window. Accordingly, modifications of setting items on the personal computer must conform to special rules of usage of HTML (HyperText Markup Language), which is the programming language of Hypertext.

SUMMARY OF THE INVENTION

However, since the average user does not know the rules of HTML, the average user cannot overwrite this Hypertext content and, therefore, cannot easily modify display content in the settings window, such as the order in which setting items are displayed.

In view of the foregoing, it is an object of the present invention to provide an image forming device and a network system that facilitates the editing of display content in a settings window for a plurality of functions possessed by the image forming device.

In order to attain the above and other objects, the present invention provides an image forming device. The image forming device includes: a communicating portion; an image forming portion; a settings image data providing portion; an edit image data providing portion; and a settings image data editing portion. The communicating portion is connected to a network and capable of performing bi-directional communications. The image forming portion forms images on a recording paper based on image data received via the communicating portion, the image forming portion having a plurality of functions. The settings image data providing portion controls the communicating portion to provide the network with settings image data in a HTML format, the settings image data indicating a setting image used for performing settings related to the plurality of functions possessed by the image forming portion. The edit image data providing portion controls the communicating portion to provide the network with edit image data in the HTML format, the edit image data indicating an edit image used for editing the settings image data. The settings image data editing portion receives, from the network via the communicating portion, an edit instruction that corresponds to the edit image data, and edits the settings image data based on the edit instruction.

According to another aspect, the present invention provides a network system including: a network; an image forming device; and a personal computer. The image forming device includes a communicating portion connected to the network and capable of performing bi-directional communications. The personal computer includes: a communicating device; a display device; and an instruction inputting portion; and a transmitting portion. The communicating device is connected to the network and is capable of performing bi-directional communications. The display device displays an image based on image data in a HTML format received from the image forming device via the communicating device. The instruction inputting portion enables a user to input various instructions. The transmitting portion controls the communicating device to transmit the instructions inputted via the instruction inputting portion to the image forming device via the network. The image forming device further includes: an image forming portion; a settings image data providing portion; an edit image data providing portion; and a settings image data editing portion. The image forming portion forms images on a recording paper based on image data received via the communicating portion from the personal computer, the image forming portion having a plurality of functions. The settings image data providing portion controls the communicating portion to provide via the network the personal computer with settings image data in the HTML format, the settings image data indicating a setting image used for performing settings related to the plurality of functions possessed by the image forming portion. The edit image data providing portion controls the communicating portion to provide via the network the personal computer with edit image data in the HTML format, the edit image data indicating an edit image used for editing the settings image data. The settings image data editing portion receives, from the personal computer via the network and the communicating portion, an edit instruction that corresponds to the edit image data, and edits the settings image data based on the edit instruction. The transmitting portion in the personal computer controls the communicating device to transmit to the image forming device a request to send the edit image data when the instruction inputting portion receives the user's request to edit the settings image, the edit image data providing portion in the image forming device controlling the communicating portion to transmit the edit image data to the personal computer upon receipt of the request, the display device in the personal computer displaying the edit image based on the edit image data. The transmitting portion in the personal computer controls the communicating device to transmit to the image forming device the edit instruction that the user inputs in the instruction inputting portion while viewing the edit image on the displaying device.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
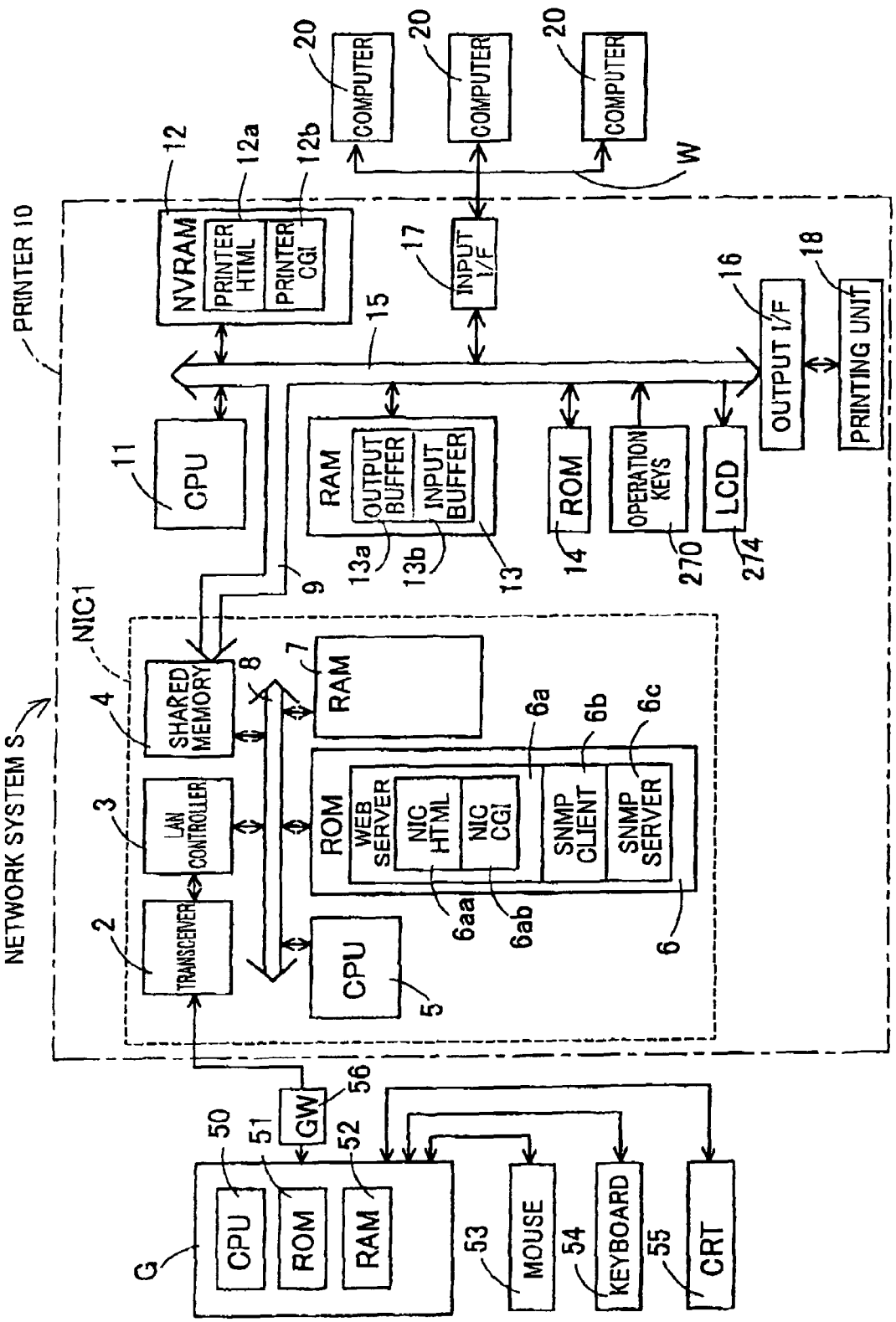
FIG. 1 is a block diagram showing the construction of a printer and a network system according to a first embodiment of the present invention.

An image forming device and a network system according to preferred embodiments of the present invention will be described while referring to the accompanying drawings wherein like parts and components are designated by the same reference numerals to avoid duplicating description.

According to first through third embodiments of the present invention printer, a printer 10 is provided in a network system S that is managed using the World Wide Web. The World Wide Web is a Wide Area Information System constructed of hypertext links on a network, allowing users to access a variety of data.

First Embodiment

First, the general construction and use of the printer 10 according to the first embodiment will be described with reference to FIG. 1 FIG. 1 is a block diagram showing the general construction and use of the printer 10 according to the first embodiment.

Generally speaking, the World Wide Web (WWW) is an information system that enables a separate administrative computer G to manage all network administration data for the printer 10. The administrative computer G includes a program called a web browser for browsing the status of settings and the like for the terminal device 10. The administrative computer G manages the network system S by accessing and learning the status of the printer 10. The administrative computer G renders image- and text-data using software links called hypertext to show the status of the printer 10. HTTP (HyperText Transfer Protocol) is used as the protocol for communications between the administrative computer G and the printer 10. Further, HTML (HyperText Markup Language), for example, is used as the language for expressing hypertext.

In the first embodiment, a program called a Common Gateway Interface (CGI) is installed on the printer 10. The CGI constructs HTML corresponding to instructions received from the administrative computer G. A network interface card (NIC) 1 is connected to the printer 10. A server computer (processing unit) is provided in the NIC 1. The server computer provides data and control data to the printer 10. Another CGI is installed in the server computer in the NIC 1. The CGI in the NIC 1 interprets data that is transmitted from the administrative computer G to the server computer. It is noted that the data transmitted from the administrative computer G to the server computer is generally called a "form." For example, when the user of the administrative computer G sets the number of copies to be printed on the printer 10 to "5," a form with the data "copies=5" is transmitted from the administrative computer G to the CGI in the server computer.

The administrative computer G identifies and designates the printer 10 based on identification data called a URL. The identification data is unique to the printer 10. In the first embodiment, the NIC 1 and the printer 10 have different URLs.

Next, the construction of the network system S will be described with reference to FIG. 1. As shown in FIG. 1, the network system S includes: the administrative computer G (personal computer), the printer 10, a network W such as a LAN or the like, and computers (personal computers) 20 connected to the printer 10 via the network W. It is noted that in this example, the total number of the computers G and 20 is X (integer greater than one).

The administrative computer G includes a CPU 50, a ROM 51, and a RAM 52. The administrative computer G is connected to a mouse 53, a keyboard 54, and a CRT monitor 55. The administrative computer G is connected to the NIC 1 in the printer 10 via a gateway 56 and is configured to communicate with the printer 10, which has a special IP address. The gateway 56 authorizes communication between the administrative computer G and the printer 10.

The NIC 1 includes a transceiver 2, a LAN controller 3, a shared memory 4, a CPU 5, a ROM 6, a RAM 7, and a bus 8. The ROM 6 stores a web server program 6a, a simple network management protocol (SNMP) client program 6b, and an SNMP server program 6c. Well-known in the art, the web server program 6a includes an NIC HTML 6aa and an NIC CGI 6ab in a database and functions as a web server through the cooperation of the LAN controller 3. The SNMP client program 6b and the SNMP server program 6c function as an SNMP client and an SNMP server (SNMP agent) also through the cooperation of the LAN controller 3.

The printer 10 further includes a CPU 11, an NVRAM 12, a RAM 13, a ROM 14, operation keys 270, an LCD 274, a bus 15, an output interface 16, an input interface 17, and a printing unit 18. The NVRAM 12 stores a printer HTML 12a and a printer CGI 12b. The RAM 13 includes an output buffer 13a and an input buffer 13b. The printer 10 is connected to the NIC 1 via a connecting line 9, which is connected to the bus 15, and is also connected to the network W via the input interface 17.

Next, an outline of operations performed in the network system S will be described with reference to FIG. 1. The CPU 50 in the administrative computer G generates request data (hereinafter simply called a request) for issuing a request to the printer 10 for data required by the administrative computer G in order to learn the status of the printer 10. The CPU 50 also generates control commands for the printer 10. The CPU 50 transmits the commands and the requests to the transceiver 2 in the NIC 1 via the gateway 56.

Upon receiving the requests or control commands, the transceiver 2 demodulates the data signals and outputs the result to the bus 8 via the LAN controller 3. The following are specific examples of the requests that are received.

(1) "GET/nic/****.html HTTP/1.0"
(2) "GET/nic-CGI/****.exe HTTP/1.0"
(3) "GET/printer/****.html HTTP/1.0"
(4) "GET/printer-CGI/****.exe HTTP/1.0"

In these examples, "GET" indicates a request, "nic," "nic-CGI," "printer," and "printer-CGI" are URLs, "**.html" or ".exe" are data indicating the object of control (generally called the resource), and "HTTP/1.0" indicates the version of HTTP. The "**" denotes a name for one of a variety of resources or an ID data set corresponding to the resource. Thus, either a URL indicating the NIC 1 ("nic" or "nic-CGI") or a URL indicating the printer 10 ("printer" or "printer-CGI") is attached to the request.

When the NIC 1 receives a request including a URL that specifies the printer 10, such as a request including the URL "printer" or "printer-CGI" in example (3) or (4) described above, the CPU 5 transfers the request to the printer 10 via the shared memory 4 and the connecting line 9. After writing the request to the shared memory 4, the CPU 5 controls through a signal line (not shown) the CPU 11 to generate an interrupt and to execute the process identified by the request. The NIC 1 performs nearly an identical process when receiving control commands. It is noted that programs required by the CPU 5 to execute the processes in response to the requests or control commands are stored in the ROM 6.

When a request or a control command specifying the printer 10 is transferred from the NIC 1 via the connecting line 9 and inputted into the printer 10, the CPU 11 acquires the request or control command through the bus 15 and subsequently processes the request or control command using the printer HTML 12a and printer CGI 12b. It is noted that the process is performed using only the printer HTML 12a when only the printer HTML 12a is necessary or using only the printer CGI 12b when only the printer CGI 12b is necessary. Next, the CPU 11 issues a response regarding the result of the process to the NIC 1 via the bus 15, the connecting line 9, and the shared memory 4. It is noted that control programs required by the CPU 11 to execute the processes in response to these requests or control commands are stored in the ROM 14.

The NVRAM 12 stores, for the plurality of computers G and 20, a plurality of sets of print function settings data, a plurality of sets of print function settings wizard data, and a plurality of sets of edit wizard data. In other words, the NVRAM 12 stores, for each computer G or 20, a set of print function settings data, a set of print function settings wizard data, and a set of edit wizard data. The set of print function settings data is used for acquiring image data from a corresponding computer G or 20 and for printing an image based on the image data. The set of print function settings wizard data is a HTML data indicative of a print function settings wizard 202 shown in FIG. 4 for displaying setting items set with the contents of the corresponding set of print function settings data. The set of edit wizard data is a HTML data indicative of an edit wizard 201 shown in FIG. 3 for being used for editing the setting items displayed on the corresponding print function settings wizard 202.

The ROM 14 stores an edit function program. The edit function program includes: a program for transmitting to a computer G or 20 a set of print function settings data and a corresponding set of print function settings wizard data in response to selection of the set of print function settings data by the subject computer G or 20 so that the subject computer G or 20 will display a corresponding print function settings wizard 202 to indicate the print function settings data; a program for transmitting a set of edit wizard data to the subject computer G or 20 so that the subject computer G or 20 will display a corresponding edit wizard 201; and a program for modifying setting items to be displayed in the print function settings wizard 202 based on check data, which is set on the edit wizard 201 and which is transmitted from the subject computer G or 20.

The ROM 14 further stores: print function programs for printing, via the printing unit 18, image data received from the computers G and 20; and flag data representing operating conditions during the print function operations.

After receiving a response to a request or a control command to be processed in the printer 10 from the printer 10, the NIC 1 transfers the response without change to the administrative computer G via the transceiver 2. Images or text data corresponding to the received response are displayed on the CRT monitor 55 by the administrative computer G after receiving a response from the printer 10 in order to learn the operational status of the NIC 1 or the printer 10.

The general construction of each computer 20 connected to the printer 10 via the network W is substantially the same as the general construction of the administrative computer G. Each computer 20 can transmit, via the network W, a request or control command identical to that transmitted by the administrative computer G to the printer 10. Each computer 20 can display images or text data corresponding to a received response on a CRT monitor, as can the administrative computer G. In this way it is possible to learn the operational status of the NIC 1 or the printer 10 As will be described later, unique identification data (ID) data sets are assigned to the administrative computer G and the computers 20. Each computer G or 20 is configured to attach its own unique ID data set to a request or control command before transmitting the request or control command to the printer 10.

Next, an edit controlling process will be described with reference to FIGS. 2-4. The edit controlling process is executed to edit the display content of the print function settings wizard 202 that the printer 10 transmits to the computer G or 20 via the NIC 1 or the input interface 17. Setting items for various functions provided in the printer 10 are displayed on the print function settings wizard 202.

Figure 2:
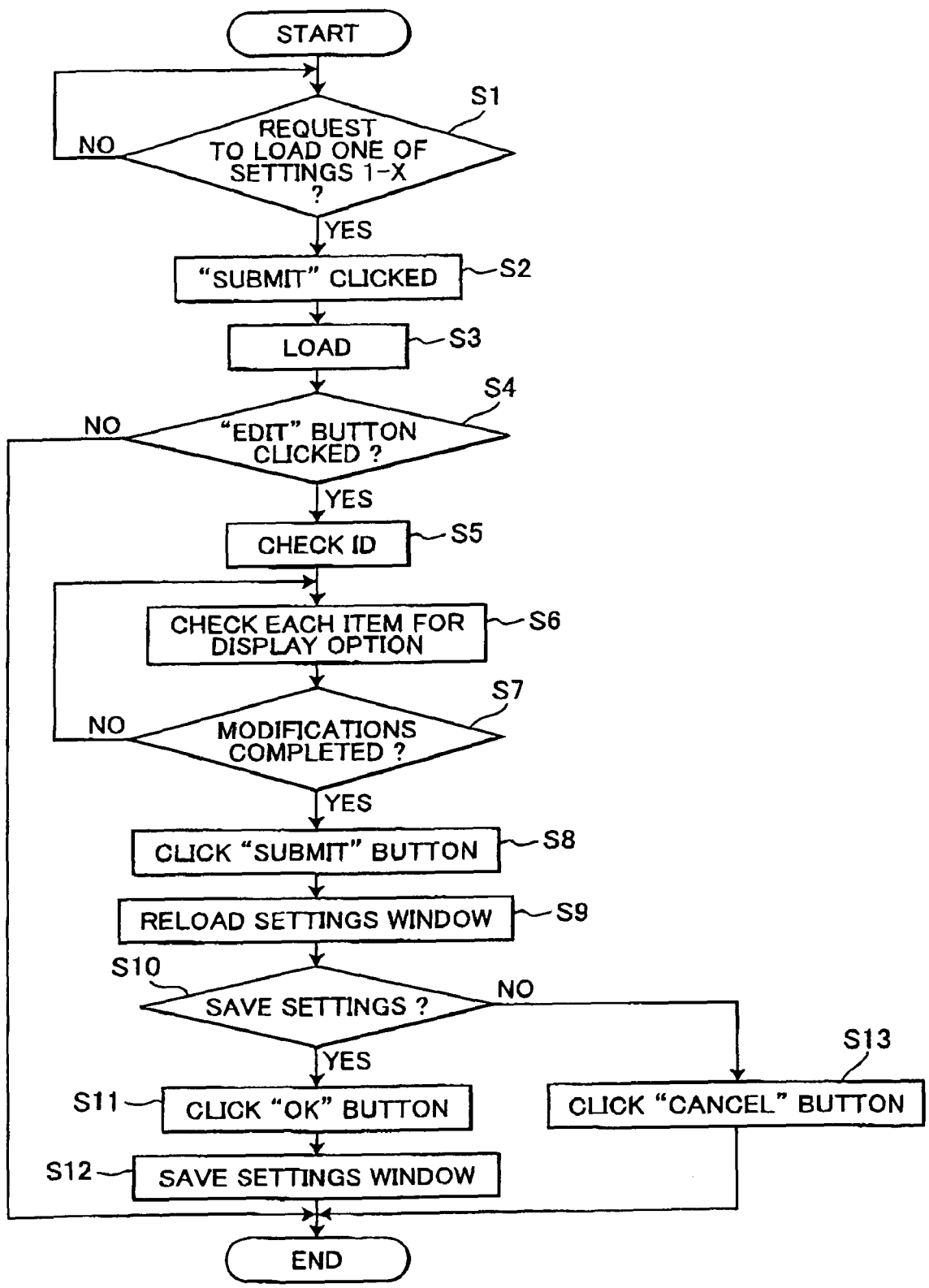
FIG. 2 is a main flow chart showing an example of the edit controlling process in which the CPU of the printer according to the first embodiment modifies setting items displayed in the print function settings wizard that is transmitted to an administrative computer or a computer.

FIG. 2 is a main flow chart showing an example of the edit controlling process. According to the edit controlling process, the CPU 11 of the printer 10 modifies setting items displayed in the print function settings wizard 202 that will be transmitted to the computer G or 20 to be displayed on the CRT monitor 55 thereof. FIG. 3 is an explanatory diagram showing an example edit wizard 201 used to edit display content in the print function settings wizard 202. FIG. 4 is an explanatory diagram showing an example of the print function settings wizard 202 that is displayed on the CRT monitor 55 of the computer G or 20 after the editing process is executed.

In the present embodiment, the NVRAM 12 stores a plurality of ID data sets for the plurality of computers G and 20, respectively. The NVRAM 12 stores the plurality of print function settings data for the computers G and 20 in one-to-one correspondence with the plurality of ID data sets. The NVRAM 12 stores the plurality of print function settings wizard data for the computers G and 20 also in one-to-one correspondence with the plurality of ID data sets. The NVRAM 12 stores the plurality of edit wizard data for the computers G and 20 also in one-to-one correspondence with the plurality of ID data sets. Because the total number of the computers G and 20 is X in this example, the NVRAM 12 stores: X number of ID data sets, X number of sets of print function settings data, X number of sets of print function settings wizard data, and X number of edit wizard data, in one-to-one correspondence with each other.

In S1 of FIG. 2, the CPU 11 waits until selection of one set of print function settings data from among the X sets of print function settings data is requested by one of the computers G and 20. If selection of one set of print function settings data is requested (S1:YES), then in S2 the CPU 11 further waits until a user on the origin of the request G or 20 clicks on a "Submit" button displayed in the CRT monitor 55 at the origin of the request G or 20 using the mouse 53. When the user clicks on the "Submit" button, the origin of the request G or 20 transmits to the printer 10 a request signal for requesting transmission of the specified print function settings data set and a corresponding set of print function settings wizard data.

In S3 the CPU 11 reads, from the NVRAM 12, the specified set of print function settings data and the corresponding set of print function settings wizard data, and transmits this data to the origin of the request G or 20 via the NIC 1 or the input interface 17. A settings window is displayed on the CRT monitor 55 at the origin of the request G or 20 based on the received print function settings wizard data and the received print function settings data. The user can perform settings for the printer 10 or issue instructions thereto using the mouse 53 or the keyboard 54 in the displayed window.

In S4 the CPU 11 waits for an "Edit" button displayed in the CRT monitor 55 of the origin of request G or 20 to be clicked by the mouse 53. If the "Edit" button is not clicked (no in S4), the process ends. On the other hand, when the "Edit" button is clicked (yes in S4), the origin of request G or 20 transmits to the printer 10 a request signal for transmission of an edit wizard data set. The origin of the request G or 20 transmits this request signal together with its own unique ID data set assigned to the origin of the request G or 20.

In S5 the CPU 11 checks the ID data set attached to the request signal requesting edit wizard data. When this ID data set matches an ID data set that is stored in the NVRAM 12 in correspondence with the print function settings data set specified in S1, the CPU 11 transmits a set of edit wizard data that is stored in the NVRAM 12 in correspondence with this ID data set to the origin of the request G or 20 to which the subject ID data set is attached. In this way, the printer 10 transmits to the origin of the request G or 20 one set of edit wizard data corresponding to the subject origin of the request G or 20. The edit wizard data set is for displaying an edit wizard 201 used for setting which setting items are to be displayed in a print function settings wizard 202 indicated by a print function settings wizard data set that corresponds to the print function settings data set specified in S1.

In S6, the computer G or 20 (origin of the request) receives this edit wizard data set and controls its own CRT monitor 55 to display an edit wizard 201 (see FIG. 3) based on the received edit wizard data. The edit wizard 201 enables a user of the computer G or 20 to set his/her display options for all the setting items displayable in the print function settings wizard 202 for the subject computer G or 20. More specifically, the user selects his/her desired setting items for functions to be displayed in the print function settings wizard 202 by using the mouse 53 to click on the entry spaces of white circles (settings item display-setting data) 201A on the left side of either "Display on" or "Display off" for each item displayed in the edit wizard 201 to insert a check in the circle 201A.

Figure 3:
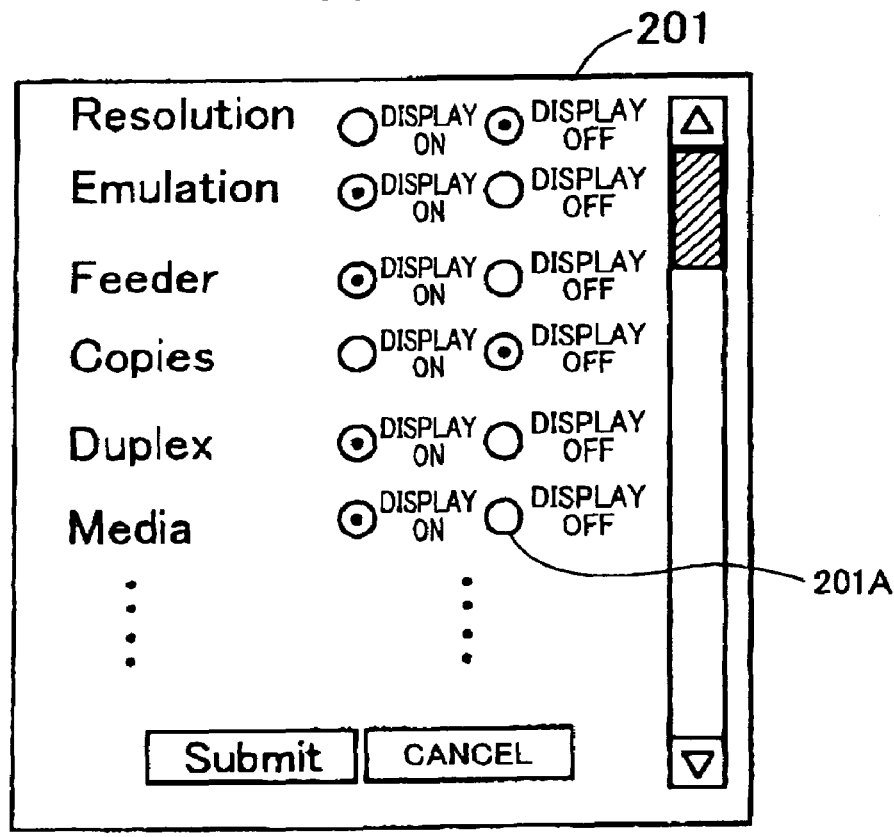
FIG. 3 is an explanatory diagram showing an example edit wizard used to edit display content in the print function settings wizard displayed on the screen of the administrative computer or a computer according to the first embodiment.

An example of the edit wizard 201 displayed on the CRT monitor 55 of either the administrative computer G or one of the computers 20 will be described with reference to FIG. 3 As shown in FIG. 3, all items that can be displayed in the print function settings wizard are displayed in a column on the left side of the edit wizard 201. Further, the selections "Display on" and "Display off" are displayed to the right of each item. To the left of each selection "Display on" or "Display off", an entry space of a white circle 201A is displayed. Each entry space 201A of a white circle can be checked by clicking with the mouse 53 is displayed to the left of each of the "Display on" and "Display off" selections. A vertical scroll bar is also displayed on the right edge of the edit wizard 201. A "Submit" button and a "Cancel" button are displayed on the bottom of the edit wizard 201. The "Submit" button is clicked by the mouse 53 to complete settings of the display items. The "Cancel" button is clicked by the mouse 53 to cancel the setting modifications.

In this example, "Resolution" indicating a setting item for the print output resolution is displayed as the first entry in the left column. The white circle 201A next to "Display off" is checked for this entry. Further, "Emulation" indicating the setting item for the emulation mode is displayed as the second entry in the left column, and the white circle 201A next to the corresponding "Display on" is checked. "Feeder" indicating the setting item of the feed tray is displayed as the third entry in the left column, and the white circle 201A next to the corresponding "Display on" is checked. "Copies" indicating the setting item for the copy function is displayed as the fourth entry in the left column, while the white circle 201A next to the corresponding "Display off" is checked. "Duplex" indicating the setting item for a two-sided print is displayed as the fifth entry in the left column, while the white circle 201A next to the corresponding "Display on" is checked. "Media" indicating the setting item of photographic media is displayed as the sixth entry in the left column, while the white circle 201A next to the corresponding "Display on" is checked.

In S7, when all setting items displayed in the edit wizard 201 have not yet been checked, that is, when the user has not yet clicked on the "Submit" button or the "Cancel" button with the mouse 53 (S7: NO), then the settings modification operation continues. However, when all modifications are completed (S7: YES), then in S8 the user clicks the "Submit" button displayed in the edit wizard 201 using the mouse 53. As a result, the "Display on" or "Display off" check data (edit instruction data) for each setting item displayed in the edit wizard 201 is produced based on the entry results in the corresponding white circle 201A and is transmitted to the printer 10. The CPU 11 temporarily stores this check data in the RAM 13. When the user clicks on the "Cancel" button displayed in the edit wizard 201 using the mouse 53, then the process is repeated from S1.

In S9 the CPU 11 edits the setting items that are to be displayed by the print function settings wizard 202 corresponding to the ID data set inputted in S5, based on the check data stored in the RAM 13. The CPU 11 edits the setting items such that only those items specified as "Display on" in the edit wizard 201 are displayed. The CPU 11 stores the new settings in the RAM 13. Then, the CPU 11 reads data of the modified print function settings wizard 202 from the RAM 13 and transmits data of the wizard 202 to the origin of the request G or 20. The modified print function settings wizard 202 is displayed on the CRT monitor 55 of the origin of the request G or 20 that receives this data.

Figure 4:
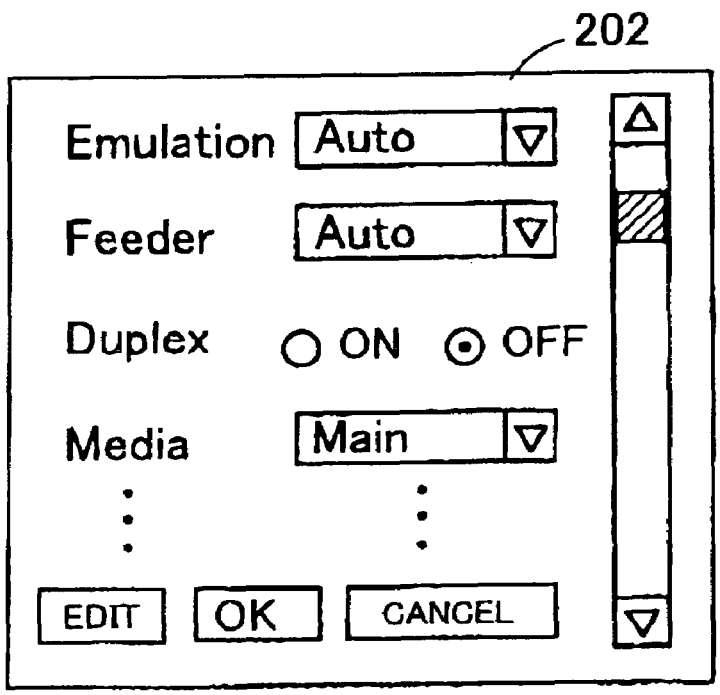
FIG. 4 is an explanatory diagram showing an example of the print function settings wizard displayed on the administrative computer or a computer according to the first embodiment after the editing process.

FIG. 4 shows an example of the print function settings wizard 202 displayed in the CRT monitor 55 of the origin of the request G or 20 after settings have been modified as by the edit wizard 201 in FIG. 3.

As shown in FIG. 4, only the setting items whose "Display on" selection has been checked in the edit wizard 201 are displayed in a print function settings wizard 202. The setting items are displayed sequentially in a column on the left side of the print function settings wizard 202. Entry areas for entering settings content are provided to the right of each setting item and are set to initial values pre-stored in the NVRAM 12. A vertical scroll bar is displayed on the right edge of the print function settings wizard 202. An "OK" button and a "Cancel" button are displayed in the bottom of the print function settings wizard 202. The "OK" button issues a request to update the NVRAM 12 with the setting items and their content. The "Cancel" button issues a request to cancel the setting items and their content.

It is noted that in S9 the window for the print function settings wizard 202 displayed on the CRT monitor 55 is displayed for confirming settings made in S6. Modifications of setting content such as changing the duplex setting from OFF to ON in this window are not accepted. Accordingly, it is possible to display only the setting items such as "Emulation" and "Feeder" in this window rather than displaying the setting content areas, such as on/off and the like, in order to distinguish this window from the window that is displayed in S3 to be actually used for print function settings operation.

In S10, the CPU 11 executes a determining process to determine whether or not to update the setting items and setting contents of the print function settings wizard 202 into the edited results (present state of the print function settings wizard 202) and whether to store these settings in the NVRAM 12. In other words, the CPU 11 determines whether the user has clicked on either the "OK" button or the "Cancel" button in the print function settings wizard 202 with the mouse 53 at the origin of the request G or 20.

If the "OK" button has been clicked with the mouse 53 (S10: YES), then the origin of the request G or 20 transmits to the CPU 11 a signal indicating that the "OK" button in the print function settings wizard 202 has been clicked. In S11, the CPU 11 determines that the "OK" button has been clicked. Then, the program proceeds to S12.

In S12, the CPU 11 updates the print function settings data and the print function settings wizard data, both of which correspond to the ID data set inputted in S5, with the edited results of the print function settings wizard 202, that is, the edited setting items and their contents. The CPU 11 sets the updated data in the NVRAM 12. The CPU 11 also updates the edit wizard data corresponding to the ID data set inputted in S5 in accordance with the edited results. Then, the process ends.

Hereafter, when a request to display one set of print function settings data (one of the data sets 1-X) is issued in S1 to the printer 10 from one of the computers G and 20, the print function settings wizard 202 updated in the NVRAM 12 as described above will be transmitted in S3 to the source of the request. For example, the settings modified by the edit wizard 201 of FIG. 3 will be transmitted as the print function settings wizard 202 shown in FIG. 4 and displayed on the CRT monitor 55 of the computer G or 20. At this time, the content of each setting item can be modified.

On the other hand, in S10 when the "Cancel" button has been clicked by the mouse 53 (S10: NO), then the origin of the request G or 20 transmits to the CPU 11 a signal indicating that the "Cancel" button in the print function settings wizard 202 has been clicked. In S13, the CPU 11 determines that the "Cancel" button has been clicked and the process ends.

Hereafter, when a request to display one set of print function settings data (one of the settings 1-X) is transferred in S1 to the printer 10 from one of the computers G and 20, the unaltered print function settings wizard 202 will be transmitted to the source of the request.

As described above, when the printer 10 of the first embodiment receives a signal from one of the administrative computer G and the computers 20 indicating that the user has used the mouse 53 to click the "Edit" button requesting to modify settings in the print function settings wizard 202 displayed on the CRT monitor 55 (S4), then the printer 10 transmits data for the edit wizard 201 for modifying setting items displayed in the print function settings wizard 202 to the administrative computer G or the computer 20 corresponding to the ID data set attached to the request signal. The user uses the mouse 53 to click on either "Display on" or "Display off" next to each setting item in the edit wizard 201 displayed on the CRT monitor 55 (S6), enabling the user to re-edit setting items displayed in the print function settings wizard 202 (S7-S13).

Therefore, by simply clicking on "Display on" or "Display off" next to each setting item in the edit wizard 201, the user can modify display items in the print function settings wizard 202 corresponding to the administrative computer G or the computer 20. Accordingly, the user can easily modify display items in the print function settings wizard 202 without knowledge of the hypertext language and its rules (for example, the language and rules of HTML and the like) using a simple method.

It is noted that at the stage prior to requesting the edit wizard 201 and editing display setting items in the print function settings wizard 202, the print function settings data specified in S1 is configured such that all setting items for all the functions possessed by the printer 10 are displayed in the default state. After editing the display setting items using the edit wizard 201, only the specified setting items are displayed in the print function settings wizard 202. When the same print function settings data is requested thereafter, items are displayed based on the edited print function settings wizard data. However, when the user of the computer wishes to perform settings from the initial state because the user has changed or due to some other circumstances, the user can return the print function settings data for the computer to the initial state (displaying all items) by clicking a "reset" button not shown in the drawings.

As described above, according to the printer 1 according to the present embodiment, the NIC 1, the NVRAM 12, and the ROM 14 cooperate to supply print function settings wizard data in the form of HTML display data to a destination device G or 20 via the transceiver 2, the LAN controller 3, and the shared memory 4 or via the input interface 17. At the destination, the print function settings wizard 202 displays setting items used by a user to perform various settings related to the plurality of functions possessed by the image forming unit 18. The CPU 11, the NVRAM 12, and the ROM 14, and the NIC 1 cooperate to also supply the destination device G or 20 with edit wizard data in the form of HTML display data. When the edit wizard 201 is displayed at the destination, display content of the print function settings wizard 202 can be edited at the destination. The CPU 11, the NVRAM 12, and the ROM 14 cooperate to edit the print function settings wizard 202 based on edit instructions that correspond to the edit wizard 201 and that is transmitted from the destination device.

In this way, the edit window 201 is displayed by using the display function of the destination device G or 20 based on the edit wizard data in the form of HTML display data supplied from the printer 10. By issuing instructions in this window using the input unit 53, 54, the user of the destination device G or 20 can transmit instructions to the printer 10 as edit instructions, and the printer 10 can automatically edit the print function settings wizard data based on these instructions. Accordingly, the user can easily edit display content of the print function settings wizard data without knowledge of HTML rules.

Especially, data of the circle-shaped entry spaces 201A (settings item display-setting data) is included in the edit wizard data (HTML display data). Accordingly, the circle-shaped entry spaces 201A (settings item display-setting data) are displayed in the edit wizard 201 by the HTML display format, and are used for setting whether or not to actually display setting items of functions that can be displayed in the print function settings wizard 202. Further, the CPU 11, the NVRAM 12, and the ROM 14 cooperate to modify setting items to be displayed on the print function settings wizard 202 based on check data (edit instructions) indicative of the entry results of the entry spaces 201A that are received from the destination device.

Since the edit wizard data includes data for the entry spaces 201A, the entry spaces 201A are displayed in the edit window 201 using the display function of the destination device. The user can set in this window whether or not to actually display setting items for each function. Hence, the user can easily modify the option of displaying setting items for functions in the print function settings wizard 202 without knowledge of HTML rules.

Since a plurality of groups of print function settings wizard data can be registered in the printer 10, the user can pre-record the plurality of groups of print function settings wizard data and select a desired group for setting in S1. Especially when the plurality of computers are sharing the printer 10, print function settings wizard data can be recorded for each computer.

In the NVRAM 12, an ID data set is stored in association with each group of print function settings wizard data. When the destination device specifies one print function settings wizard data group and provides an ID data set, the CPU 11 determines whether the received ID data set matches the ID data set pre-recorded in association with the specified print function settings data group. When the ID data sets match, the print function settings wizard data group corresponding to the ID data set is provided to the destination device.

Hence, even if the plurality of computers use the printer 10, by providing a plurality of print function settings wizard data groups assigned with ID data sets and by assigning an ID data set to each computer, it is possible to extract one group of print function settings wizard data specified by the computer. By managing the plurality of print function settings wizard data groups with ID data sets, it is possible to prevent print function settings wizard data set by one computer from being edited by another computer.

According to the network system S of the present embodiment, the printer 10 and the personal computers G and 20 are connected via the network and can perform bi-directional communications with each other. The printer 10 provides print function settings wizard data to the personal computer G or 20 via the network as HTML display data The print function settings wizard data indicates setting items for performing various settings related to the plurality of functions of the printing unit 18. When the printer 10 receives a request from the personal computer G or 20 to transmit edit wizard data for editing the display content of print function settings wizard data, the printer 10 transmits edit wizard data to the personal computer G or 20 via the network as HTML display data. When the personal computer G or 20 receives edit wizard data as HTML display data, the personal computer G or 20 displays the edit wizard 201 in the CRT 55. Next, the personal computer G or 20 transmits, to the printer 10 via the gateway 56 or the input interface 17, check data (edit instruction data) which the user inputs by using the mouse 53 or the keyboard 54 while viewing the edit wizard 201 displayed on the CRT 55. At this time, the printer 10 edits the print function settings wizard data based on the check data (edit instruction data) received from the network via the gate way 56 or the input interface 17.

In this way, various settings can be made to the plurality of functions provided in the printing unit 18 by displaying a settings window 201 in the CRT 55 of the personal computer G or 20 based on print function settings wizard data and issuing setting instructions through the mouse 53 or the keyboard 54 of the personal computer G or 20. In addition, various settings can be made to the settings items to be displayed on the settings window 201 by displaying an edit window 201 in the CRT 55 of the personal computer G or 20 based on edit wizard data and issuing edit instructions through the mouse 53 or the keyboard 54 of the personal computer G or 20. These edit instructions are transmitted to the printer 10 as check data and the printer 10 automatically edits the print function settings wizard data based on this check data. Accordingly, the user can easily edit the display content of print function settings wizard data by issuing simple instructions in the edit window 201 without knowledge of HTML rules.

Since an ID data set is assigned to each personal computer in this network system S, the printer 10 can manage various instructions received from the plurality of personal computers using these ID data sets.

Modification

In the above description, each of the computers G and 20 is configured to be capable of editing the print function settings wizard 202 only for itself because the printer 10 executes the process of S5 to judge whether the ID data set transmitted in S5 from the computer G or 20 together with the request for the edit wizard 201 matches the ID data set corresponding to the print function settings data specified in S1. In this modification, however, the editing controlling process of FIG. 2 is modified so that the administrative computer G can edit the print function settings wizard 202 not only for the administrative computer G itself but also for the computers 20. More specifically, in S1, the administrative computer G specifies one set of print function settings data for either itself or one of the computers 20. It is now assumed that the administrative computer G specifies one set of print function settings data for one of the computers 20. In S5, the administrative computer G transmits to the printer 10 the ID data set for its own together with the request for the edit wizard 201. According to the present modification, the CPU 10 judges in S5 whether or not the received ID data set is for the administrative computer G. If the ID data set is for the administrative computer G, the CPU 10 fails to execute the judging operation to judge whether or not the received ID data set with an ID data set for the print function settings data set specified in S1, but always supplies the administrative computer G with an edit wizard data set that corresponds to the print function settings data set specified in S1. In other words, the CPU 11 always supplies the administrative computer G with an edit wizard data set for the computer 20 specified in S1. In S9, the CPU 11 edits the setting items that are to be displayed on a print function settings wizard 202 for the specified computer 20. In S12, the CPU 11 updates the print function settings data and the corresponding print function settings wizard data for the computer 20 with the edited results.

Second Embodiment

Next, a printer according to a second embodiment will be described with reference to FIGS. 5 and 6 with like parts and components designated by the same reference numerals to avoid duplicate description.

Figure 5:
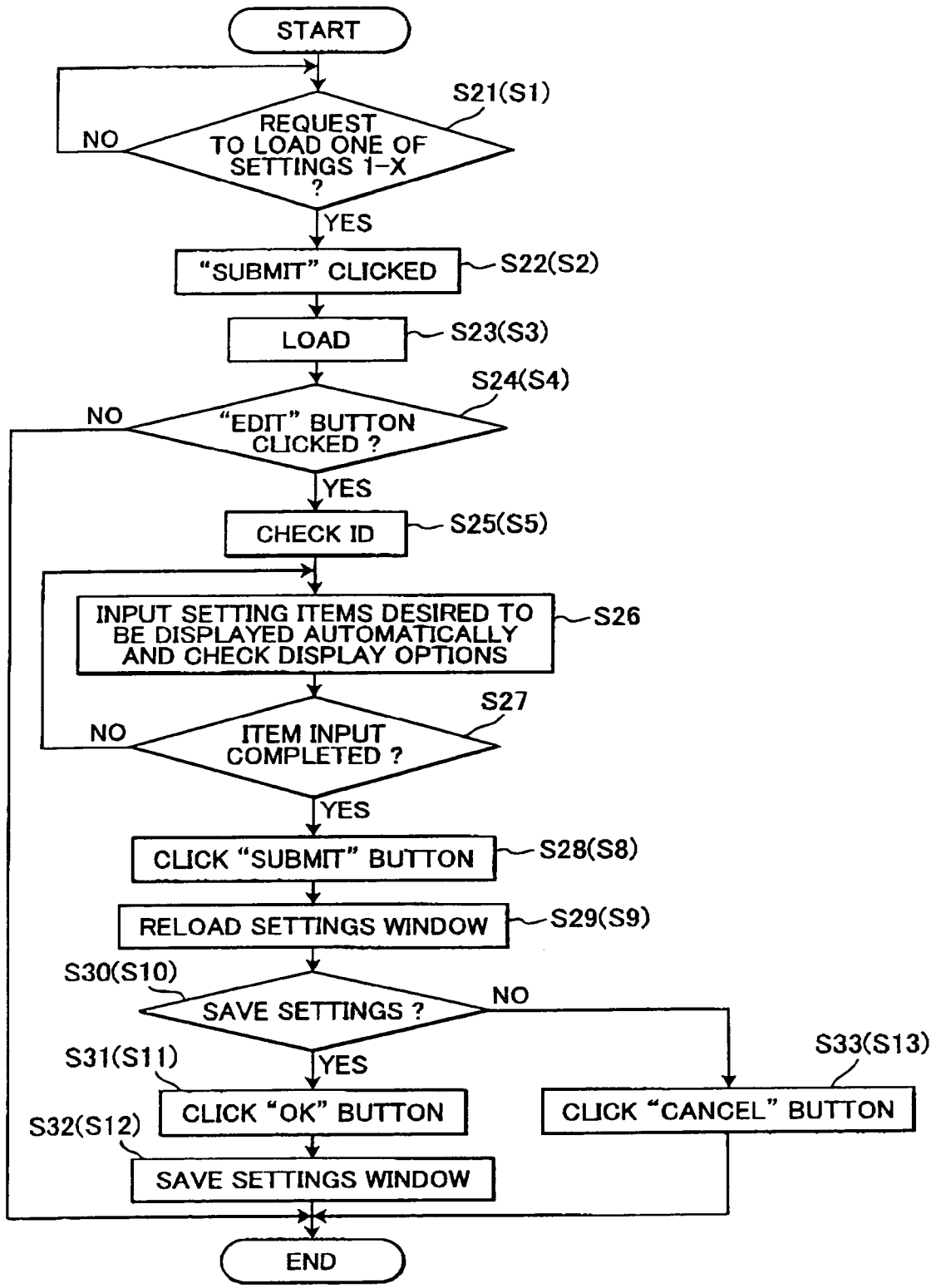
FIG. 5 is a main flow chart showing an example of the edit controlling process in which the CPU of the printer according to a second embodiment modifies setting items displayed in the print function settings wizard that is transmitted to an administrative computer or a computer.

FIG. 5 is a main flow chart showing an example of the edit controlling process in which the CPU 11 of the printer 10 according to the second embodiment modifies setting items displayed in the print function settings wizard that is transmitted to the administrative computer G or the computers 20. FIG. 6 is an explanatory diagram showing an example edit wizard used to modify settings data displayed in the print function settings wizard on the screen of the administrative computer G or the computers 20 according to the second embodiment.

The overall construction of the printer according to the second embodiment and the construction of the control circuit are substantially identical to the printer 10 according to the first embodiment. However, the printer according to the second embodiment differs from the printer 10 according to the first embodiment in that the user directly enters setting items that the user wishes to display in the print function settings wizard 202 sequentially in the setting item entry areas in the edit wizard displayed on the CRT monitor 55.

Next the edit control process for modifying setting items displayed in the print function settings wizard 202 for the printer 10 according to the second embodiment will be described with reference to FIGS. 5 and 6.

As shown in FIG. 5, the control process from S21 through S25 is identical to the control process executed for S1-S5 described above. In S26 an edit wizard 205 (see FIG. 6) is displayed on the CRT monitor 55 of the administrative computer G or one of the computers 20 that has received data for the edit wizard 205. The edit wizard 205 serves to set which of the setting items to display in the print function settings wizard 202 from among all setting items that can be displayed. More specifically, using the keyboard 54, the user sequentially enters setting items that the user wishes to display in the print function settings wizard 202 in the entry spaces (layout or "order" settings data) displayed in the edit wizard 205. Using the mouse 53, the user clicks on the white circles 201A on the left side of either "Display on" or "Display off" for each entry to select setting items to be displayed in the print function settings wizard 202. It is noted that a list of the names of all the setting items that can be entered may be added to the edit wizard 205. While referring to this list, the user can enter setting items that the user thinks are necessary. Alternatively, the display can be configured to select and enter setting items from the list as they are clicked with the mouse 53.

Next, an example of the edit wizard 205 displayed on the CRT monitor 55 of either the administrative computer G or one of the computers 20 will be described with reference to FIG. 6.

Figure 6:
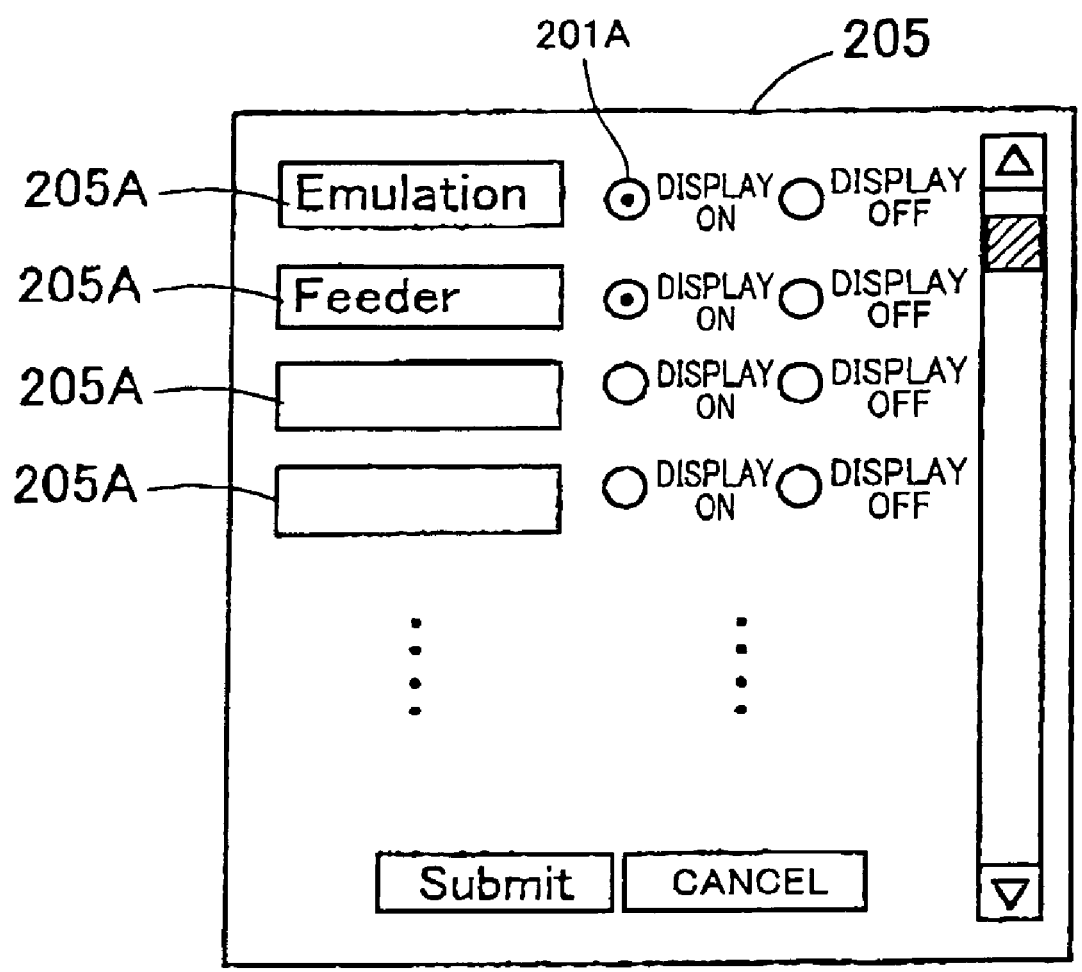
FIG. 6 is an explanatory diagram showing an example edit wizard used to modify setting items to be displayed in the print function settings wizard transmitted to the administrative computer or a computer according to the second embodiment.

As shown in FIG. 6, entry spaces 205A are displayed in a column on the left side of the edit wizard 205. The entry spaces 205A enable the user to enter setting items to be displayed on the print function settings wizard 202 using the keyboard 54. Further, the selections "Display on" and "Display off" are displayed to the right of each item and a white circle 201A that can be checked by clicking with the mouse 53 is displayed to the left of each of the "Display on" and "Display off" selections. A vertical scroll bar is also displayed on the right edge of the edit wizard 205. A "Submit" button and a "Cancel" button are displayed on the bottom of the edit wizard 205. The "Submit" button is clicked by the mouse 53 to complete settings of the display items. The "Cancel" button is clicked by the mouse 53 to cancel the setting modifications.

For example, "Emulation" indicating the setting item of the emulation mode is entered in the first entry space 205A on the left, and the white circle 201A is checked next to the corresponding "Display on." Further, "Feeder" indicating the setting item of the feed tray is displayed in the second entry space 205A on the left, and the white circle 201A is checked next to the corresponding "Display on."

Next in S27 shown in FIG. 5, when all setting items that the user wishes to display in the print function settings wizard 202 have not yet been entered in the entry spaces 205A displayed in the edit wizard 205, that is, when the user has not yet clicked either the "Submit" button or the "Cancel" button using the mouse 53 (S27: NO), then the settings modification operation continues. When the setting modifications are completed (S27: YES), then the same control processes from S8 to S13 described above are executed from S28 through S33.

Therefore, by simply entering desired setting items in a desired order in the edit wizard 205 using the keyboard and clicking on "Display on" or "Display off" next to each setting item, the user can modify display items in the print function settings wizard 202 corresponding to the administrative computer G or the computer 20. Accordingly, the user can easily modify display items in the print function settings wizard 202 without knowledge of the hypertext language and its rules (for example, the language and rules of HTML and the like) using a simple method.

Further, the layout settings for display items in the print function settings wizard 202 are set by directly inputting setting items in the order of display desired by the user. Hence, the user can more easily set the order in which setting items are desired to be displayed in the print function settings wizard 202, rather than simply indicating whether or not to display the setting items. Therefore, the user can display setting items in a convenient order according to the frequency in which each function is used.

As described above, according to the present embodiment, data of the entry spaces 205A (layout setting data) is included in the edit wizard data (HTML display data). Accordingly, the entry spaces 205A are displayed in the edit wizard 205 in the HTML format. The entry spaces 205A are used for setting the layout of the displayable setting items in an arbitrary order in the print function setting wizard 202. The CPU 11, the NVRAM 12, and the ROM 14 cooperate to modify the layout order of setting items to be displayed in the wizard 202 based on check data (edit instruction data) indicative of the entry results of the entry spaces 205A that is transmitted from the destination device.

By including the entry space data in the edit wizard data 205, the display function of the destination device can be directed to display the entry spaces 205A in the edit window 205, and the setting items for each function that can be displayed in the window 202 can be arranged in a desired order. Hence, the user can easily modify the order of setting items for each function to be displayed in the print function settings wizard 202 without any knowledge of HTML rules.

Especially, since the user can directly input in the entry spaces 205A his/her desired setting items in his/her desired display order, the user can easily modify setting items to be displayed in the setting window 202 and the layout order of the setting items.

Third Embodiment

Next, a printer according to a third embodiment will be described with reference to FIGS. 7 and 8, wherein like parts and components have the same reference numerals to avoid duplicate description.

Figure 7:
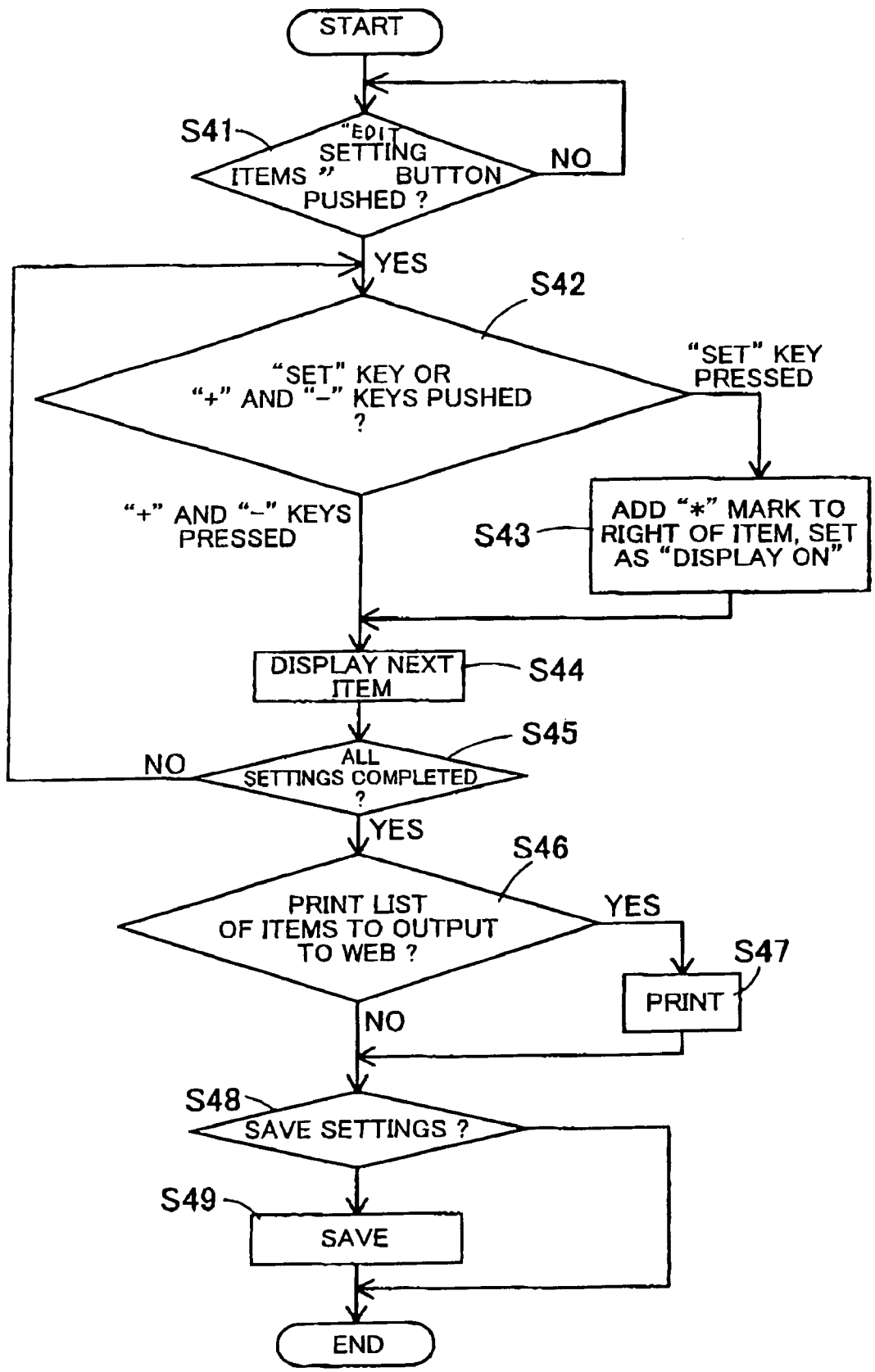
FIG. 7 is a main flow chart showing an example of the edit controlling process in which the CPU of the printer according to a third embodiment modifies by using an LCD setting items displayed in the print function settings wizard that is transmitted to an administrative computer or a computer.
Figure 8:
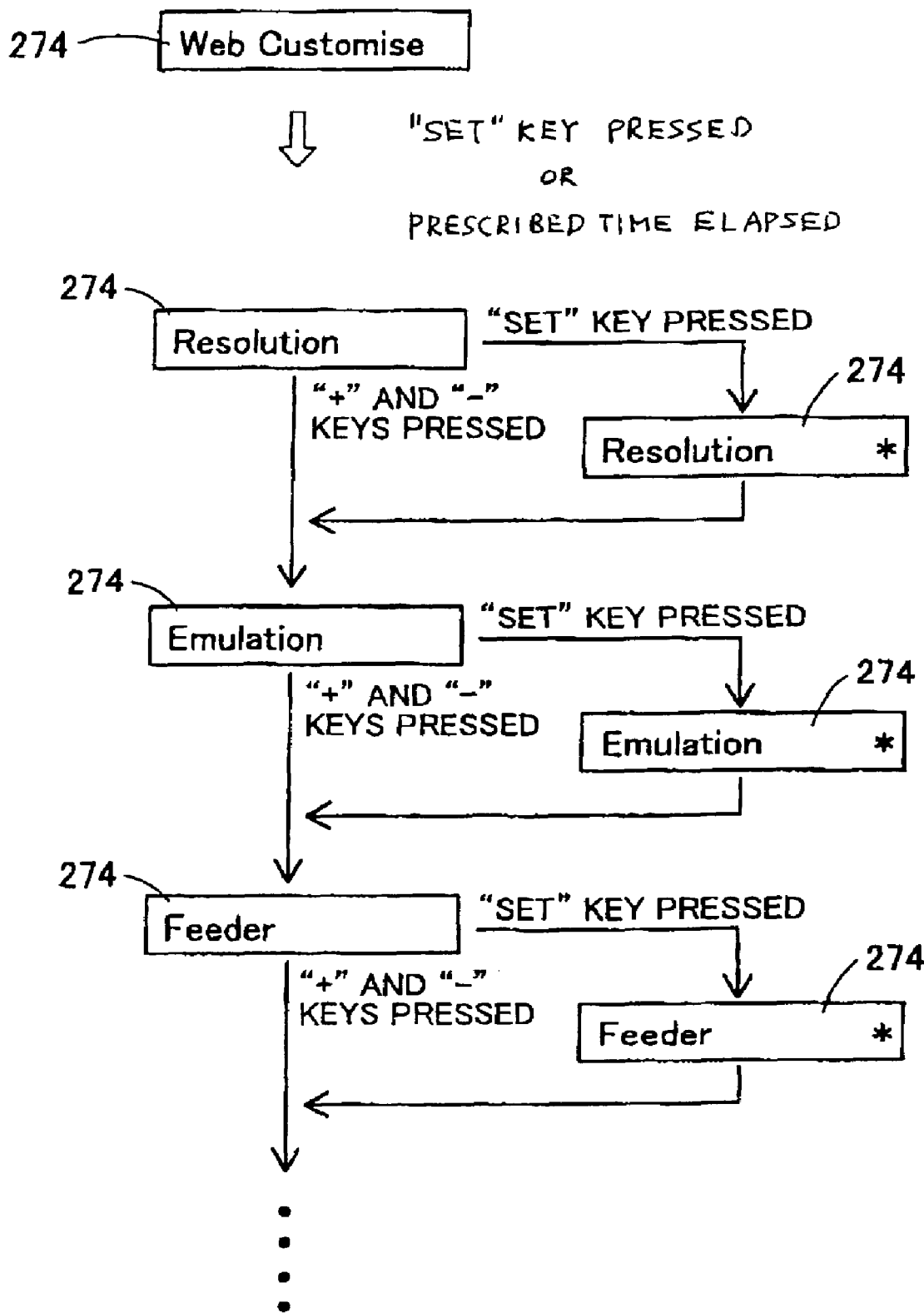
FIG. 8 is an explanatory diagram showing an example LCD display when modifying setting items to be displayed in the print function settings wizard according to the third embodiment.

FIG. 7 is a main flowchart showing an edit controlling process executed by the CPU 11 to modify via the LCD 274 setting items to be displayed in the print function settings wizard 202 to be transmitted to the computer G or 20. FIG. 8 is an explanatory diagram showing an example display on the LCD 274 when modifying setting items to be displayed in the print function settings wizard 202 according to the third embodiment.

The overall construction of the printer according to the third embodiment and the construction of the control circuit are substantially identical to the construction of the printer 10 according to the first embodiment. However, the printer according to the third embodiment differs from the printer 10 according to the first embodiment in that setting items that the user wishes to display in the print function settings wizard 202 transferred to the administrative computer G or the computers 20 can be modified using the operation keys 270 and the LCD 274 provided on the printer 10.

Next, the process for modifying via the LCD 274 setting items to be displayed on the print function settings wizard 202 will be described with reference to FIG. 7. As shown in FIG. 7, first the CPU 11 waits until an "Edit Setting Items" button in the operation keys 270 is pushed (S41: NO).

When the "Edit Setting Items" button has been pushed (S41: YES), then in S42 the CPU 11 displays "Web Customize" on the LCD 274 to notify the user that the process for modifying setting items to be displayed on the print function settings wizard 202 has begun. If the user presses a "Set" key in the operation keys 270 or after a prescribed time has elapsed, the CPU 11 starts displaying all the setting items that can be displayed in the print function settings wizard 202 one by one in a prescribed order. While displaying one setting item, the CPU 11 executes a determining process to determine whether the user presses the "Set" key in the operation keys 270 for the setting item or whether the user simultaneously presses the "+" key and "−" key in the operation keys 270.

When the user has pressed the "Set" key (S42: "Set" key pressed), then in S43 the CPU 11 displays a "*" mark in the right side of the LCD 274 and temporarily stores the item in the RAM 13 as a setting item to be displayed on the print function settings wizard 202. Then, the program proceeds to S44.

On the other hand, when the user has pressed the "+" key and "−" simultaneously (S42: "+" and "−" keys pressed), then the program proceeds to S44. In S44 the CPU 11 displays the next setting item that can be displayed on the print function settings wizard 202 on the LCD 274.

It is noted that the process can be configured such that only the "+" key need be pushed rather than both the "+" and "−" keys. In this case the process can be reconfigured to redisplay the previously displayed setting item when the "−" key is pressed.

In S45 the CPU 11 executes a determining process to determine whether all setting items displayable on the print function settings wizard 202 have been displayed on the LCD 274. When all setting items have not yet been displayed on the LCD 274 (S45: NO), then the process is repeated from S42.

Next, an example of screens displayed on the LCD 274 during this modification process will be described with reference FIG. 8. As shown in FIG. 8, "Web Customize" is first displayed on the LCD 274 according to the process of S41. When the "Set" key is pressed or after a prescribed time has elapsed, "Resolution" indicating the setting item for the print output resolution is displayed as the first of the setting items that can be displayed on the print function settings wizard 202. When the "Set" key is pressed at this time, the mark "*" is displayed in the right side of the LCD 274, "Resolution" is temporarily stored in the RAM 13 as a setting item to be displayed on the print function settings wizard 202, and the second setting item "Emulation" is displayed in the LCD 274. On the other hand, while the "Resolution" is being displayed in the LCD 274, if the "+" key and "−" key are pressed, "Resolution" is temporarily stored in the RAM 13 as a setting item not to be displayed on the print function settings wizard 202, and the second setting item "Emulation" is displayed on the LCD 274.

While "Emulation," is being displayed as the second setting item, when the "Set" key is pressed, the mark "*" is displayed in the right side of the LCD 274 In this case, "Emulation" is temporarily stored in the RAM 13 as a setting item to be displayed on the print function settings wizard 202, and the third setting item "Feeder" is displayed in the LCD 274 On the other hand, while "Emulation" is being displayed, if the "+" key and "−" key are pressed, "Emulation" is temporarily stored in the RAM 13 as a setting item not to be displayed on the print function settings wizard 202, and the third setting item "Feeder" is displayed on the LCD 274.

While "Feeder" is being displayed as the third setting item, when the "Set" key is pressed, the mark "*" is displayed in the right side of the LCD 274, "Feeder" is temporarily stored in the RAM 13 as a setting item to be displayed on the print function settings wizard 202, and the fourth setting item is displayed in the LCD 274. On the other hand, while "Feeder" is being displayed, if the "+" key and "−" key are pressed, "Feeder" is temporarily stored in the RAM 13 as a setting item not to be displayed on the print function settings wizard 202, and the fourth setting item is displayed on the LCD 274. In this way, all the settings items at all the hierarchical ranks are displayed on the LCD 274 in succession and are selectively set as those items that are to be displayed on the print function settings wizard 202.

Next, as shown in FIG. 7, when all setting items have been displayed on the LCD 274 (S45: YES), then in S46 the CPU 11 displays "Display list?" on the LCD 274 and executes a determining process to determine whether the user has requested to print a list of the setting items now temporarily stored in the RAM 13 as setting items to be displayed on the print function settings wizard 202.

If the user has pressed a "Print" key in the operation keys 270 within a prescribed time period (S46: YES) then in S47 the CPU 11 prints out the list using the printing unit 18. However, if the "Print" key has not been pressed within the prescribed time period (S46: NO), then the CPU 11 does not print out the list.

In S48 the CPU 11 displays "Save settings?" on the LCD 274. The CPU 11 executes a determining process to determine whether to update the setting items in the NVRAM 12 to be displayed on a new print function settings wizard 202 using the setting items temporarily stored in the RAM 13.

If the "Set" key has been pressed (S48: "Set" key pressed), then the CPU 11 updates the NVRAM 12 with the setting items temporarily stored in the RAM 13 as the setting items to be displayed in the new print function settings wizard 202.

Hereafter, when the printer 10 receives a request to display the print function settings wizard 202 from the administrative computer G or one of the computers 20, the printer 10 transmits the updated print function settings wizard 202 now stored in the NVRAM 12 to the administrative computer G or the computer 20.

On the other hand, when the user has pressed the "+" key and "−" key simultaneously (S48: "+" key and "−" key pressed), then the CPU 11 ends the process without updating the print function settings wizard 202 stored in the NVRAM 12.

Hereafter, when the printer 10 receives a request to display the print function settings wizard 202 from the administrative computer G or one of the computers 20, the printer 10 transmits the unaltered print function settings wizard 202 now stored in the NVRAM 12 to the administrative computer G or the computer 20.

Accordingly, the user of the printer according to the third embodiment can determine which setting items to include in the display of the print function settings wizard 202 by pressing either the "Set" key or by simultaneously pressing the "+" key and "−" key for each setting item displayed sequentially on the LCD 274. Therefore the user can easily modify setting items to be displayed in the print function settings wizard 202 on the CRT monitor 55 of the administrative computer G or one of the computers 20 through a simple method and without knowledge of the hypertext language. After the process of FIG. 7 has been executed, when the process of FIG. 7 is executed again to further modify the display options of setting items, in the display processes of S42 and S44, "*" marks will be attached to those items that have been set to "Display on" during the latest-executed process of FIG. 7. Hence, the user can easily change these settings to "Display off."

As described above, according to the present embodiment, the printer 10 is provided with the LCD 274, which displays sequentially in a prescribed order all the setting items that can be displayed in the print function settings wizard 202. The operation keys 270 are used to set whether to include each setting item displayed in the LCD 274 in the print function settings wizard 202. Further, the CPU 11, the NVRAM 12, and the ROM 14 cooperate to modify the print function settings wizard data to display only setting items that are set by the operation keys 270 to be included in the print function settings wizard 202. With this construction, setting items that can be displayed in the print function settings wizard 202 are displayed sequentially in the LCD 274. By setting whether setting items displayed in the LCD 274 are desired to be included in the print function settings wizard 202 according to the operation keys 270, print function settings wizard data can be edited based on the settings. Accordingly, display content of print function settings wizard 202 can be edited through operations on the printer 10 side rather than only through the edit wizard data on the destination G or 20 side. Further, setting items edited through operations on the printer 10 side can be reflected in print function settings wizard data to be transmitted to the destination.

While the invention has been described in detail with reference to the specific embodiments thereof, it would be apparent to those skilled in the art that various changes and modifications may be made therein without departing from the spirit of the invention.

For example the following variations are possible.

(A) Since the print function settings wizard 202 is assigned separately to each computer 20 in the first and second embodiments described above, the unique ID data set assigned to each computer G or 20 is checked in the process of S5 or S25. That is, the CPU 11 judges whether or not the received ID data set matches an ID data set that is stored in the NVRAM 12 in correspondence with the print function settings data set specified in SI. However, in S5 or S25, the CPU 11 may judge whether or not the received ID data set matches any one of the ID data sets that are stored in the NVRAM 12. When the received ID data set matches some ID data set stored in the NVRAM 12, the CPU 11 may transmit edit wizard data to the origin of the request specified by the received ID data set.

(B) A plurality of passwords may be assigned to a plurality of specific users. In the NVRAM 12, the plurality of sets of print function settings wizard data and the plurality of passwords may be stored in one to one correspondence with each other. In S5 (S25), the password of the user is transmitted from the computer 20 or G to the printer 10 together with the edit wizard request. The printer 10 judges whether the password is identical to a password for the print function settings wizard data specified in S1 (S21). It is possible to prevent a conflict between users when a plurality of users share a single computer, thereby preventing the content of a print function settings wizard 202 assigned to a certain user from being modified by another user. Alternatively, a single password may be assigned to an administrator only so that only the administrator can edit a print function settings wizard 202 for the administrative computer G.

(C) In the second embodiment, desired setting items are entered in the entry spaces 205A displayed in a column on the left side of the edit wizard 205, and the user clicks the white circles 201A next to either "Display on" or "Display off" using the mouse 53. However, an edit wizard 207 shown in FIG. 9 can be used in place of this edit wizard 205.

Figure 9:
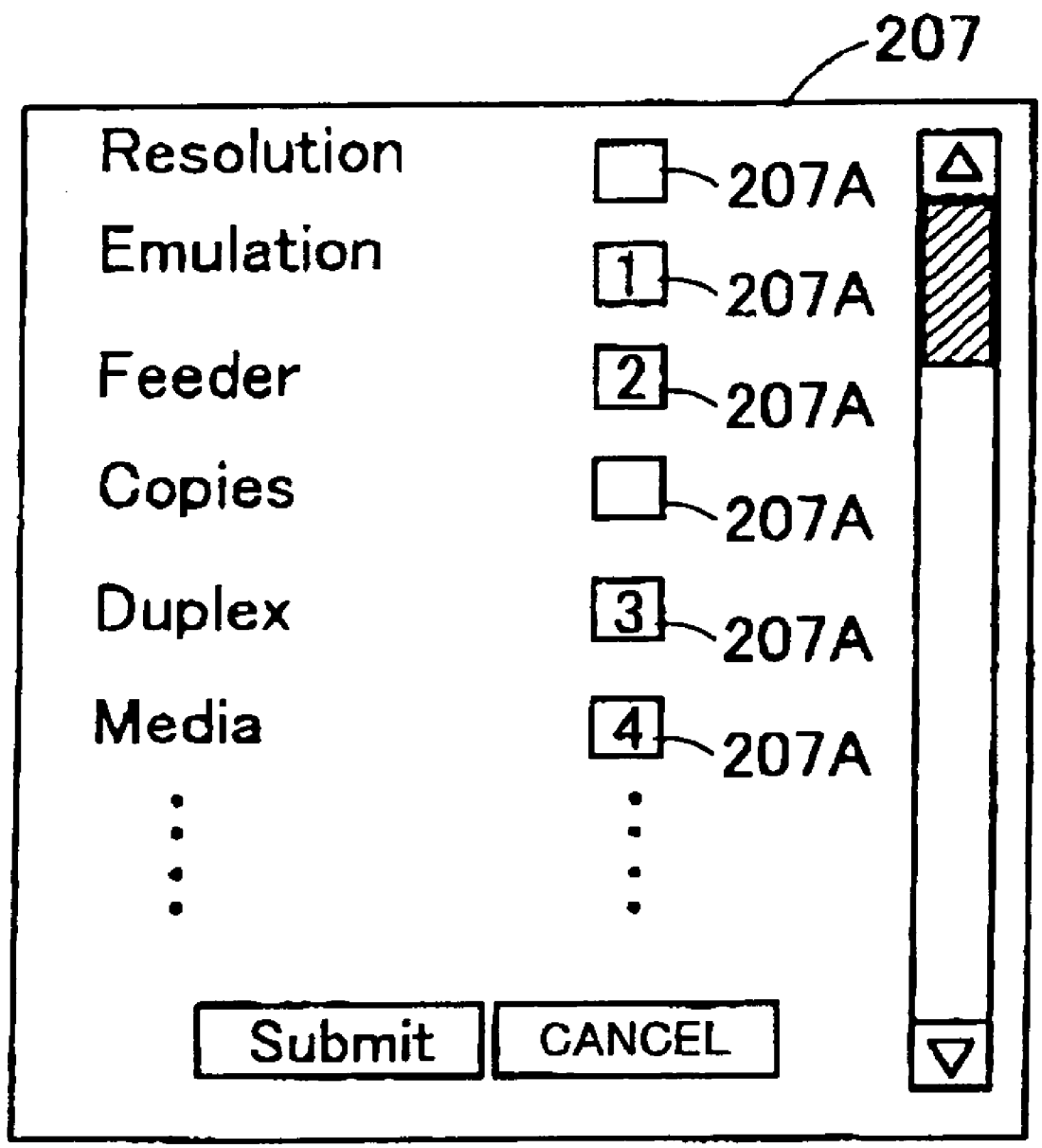
FIG. 9 is an explanatory diagram showing an example edit wizard used to modify setting items to be displayed in the print function settings wizard on the CRT screen of the administrative computer or a computer according to a variation of the embodiments.

As shown in FIG. 9, all the setting items that are displayable in the print function settings wizard 202 are listed in a column on the left side of the edit wizard 207 for each function. Further, number entry spaces 207A (layout or order setting data) are displayed to the right of each setting item to indicate the order for displaying these setting items in the print function settings wizard 202. A vertical scroll bar is also displayed on the right edge of the edit wizard 207. A "Submit" button and a "Cancel" button are displayed on the bottom of the edit wizard 207. The "Submit" button is clicked by the mouse 53 when the user has finished setting display items. The "Cancel" button is clicked by the mouse 53 when the user wishes to cancel the setting modification operation.

For example, "Resolution" indicating the setting item of the print output resolution is displayed as the first entry in the left column. However, no number has been entered into the number entry space 207A to the right. Not entering a number represents an editing instruction to not display the setting item "Resolution" in the print function settings wizard 202.

Further, "Emulation" indicating the setting item of the emulation mode is displayed as the second entry in the left column. The number "1" has been entered into the number entry space 207A to the right by the keyboard 54. The "1" indicates an editing instruction to display the setting item "Emulation" as the first entry in the left side of the print function settings wizard 202.

Further, "Feeder" indicating the setting item of the feed tray is displayed as the third entry in the left column. The number "2" has been entered in the numbered entry space 207A to the right by the keyboard 54. Hence, the "2" indicates an editing instruction to display the setting item "Feeder" as the second entry in the left side of the print function settings wizard 202.

Further, "Copies" indicating the setting item of the copy function is displayed as the fourth entry in the left column. However, no number has been entered into the numbered entry space 207A to the right Not entering a number represents an editing instruction to not display the setting item "Copies" in the print function settings wizard 202.

Further, "Duplex" indicating the setting item for two-sided printing is displayed as the fifth entry in the left column. The number "3" has been entered into the numbered entry space 207A to the right by the keyboard 54. The "3" indicates an editing instruction to display the setting item "Duplex" as the third entry in the left side of the print function settings wizard 202.

Further, "Media" indicating the setting item of the photographic media function is displayed as the sixth entry in the left column. The number "4" has been entered in the numbered entry space 207A to the right by the keyboard 54. Hence, the "4" indicates an editing instruction to display the setting item "Media" as the fourth entry in the left side of the print function settings wizard 202.

Hence, the user of the printer according to this variation can simultaneously modify the type of items displayed in the print function settings wizard 202 and the order in which the items are displayed simply by inputting a number for setting items to be displayed in the print function settings wizard 202 in the numbered entry spaces 207A next to the desired setting items. Therefore, the user can easily modify items to be displayed in the print function settings wizard 202 through a simple process without knowledge of the hypertext language and rules.

Further, the layout order of the items to be displayed in the print function settings wizard 202 is set by directly inputting a display order number desired by the user in the numbered entry spaces 207A. Hence, the user can easily set the order in which setting items are displayed in the print function settings wizard 202.

As described above, according to this modification, since the user can assign a desired display order to displayable setting items by entering his/her desired order numbers to the number entry spaces 207A, the user can easily set setting items to be displayed in the setting window 202 and can easily modify the layout order of these setting items.

(D) Instead of the NVRAM 12, the ROM 6 may store the plurality of ID data sets for the plurality of computers G and 20. The ROM 6 may store the plurality of passwords for the plurality of users.

(E) In the above-described embodiments and modification of the first embodiment, in S5 (S25), the CPU 11 executes judging operation to judge whether the received ID data set matches with the ID data set for the specified print function setting data. However, the CPU 6 may execute this judgment when the ID data set is received from the administrative computer G.

What is claimed is:

1. An image forming device comprising:
    a communicating portion connected to a network and capable of performing bi-directional communications;
    an image forming portion forming images based on image data, the image forming portion having a plurality of functions;
    a storage portion storing settings image data, the settings image data indicating a settings image that lists at least one setting item among a plurality of setting items, the plurality of setting items corresponding to the plurality of functions possessed by the image forming portion, respectively,
    an edit image data providing portion controlling the communicating portion to provide the network with edit image data, the edit image data indicating an edit image that enables a user to identify at least one setting item desired to be listed in the settings image from among the plurality of setting items;
    a settings image data editing portion receiving, from the network via the communicating portion, an edit instruction that is inputted in association with the edit image and that indicates at least one setting item identified by the user, and editing the settings image data, based on the edit instruction, to include only the at least one setting item identified by the user in the settings image and to exclude at least one setting item not identified by the user from the settings image, the settings image data editing portion updating the settings image data stored in the storage portion with the edited settings image data; and
    a settings image data providing portion controlling the communicating portion to provide the network with the settings image data edited by the settings image data editing portion, the edited settings image data indicating an edited settings image that lists only the at least one setting item identified by the user among the plurality of setting items, the at least one setting item listed in the edited settings image being used for performing settings related to the corresponding at least one function possessed by the image forming portion, the edited settings image enabling the user to perform settings related to the at least one function corresponding to the at least one setting item identified by the user.

2. An image forming device as claimed in claim 1, wherein the edit image data is indicative of the edit image that enables a user to identify a setting item desired to be included in the settings image, and wherein the settings image data editing portion edits the settings image data based on the edit instruction by including only the user's identified setting item in the settings image and by excluding the user's non-identified setting item from the settings image.

3. An image forming device as claimed in claim 2, wherein the edit image data includes settings item inclusion-setting data indicative of a settings item inclusion-setting portion in the edit image used for setting whether or not to include, in the settings image, a setting item used for performing a setting for each of the plurality of functions, and
    wherein the settings image data editing portion receives the edit instruction that is inputted in association with the settings item inclusion-setting portion in the edit image, and edits, based on the edit instruction, the settings image data to selectively include the setting item for each function in the settings image.

4. An image forming device as claimed in claim 2, wherein the edit image data includes layout setting data indicative of a layout setting portion in the edit image used for setting an arrangement how the setting item for each of the plurality of functions is to be selectively arranged in the settings image, and
    wherein the settings image data editing portion receives the edit instruction that is inputted in association with the layout setting portion in the edit image, and edits, based on the edit instruction, determines an arrangement how the setting item for each function is to be selectively arranged in the settings image.

5. An image forming device as claimed in claim 2, wherein the storage portion stores a plurality of sets of settings image data; and
   wherein the image data forming device further comprises a selecting portion receiving, from the network via the communicating portion, a selection instruction specifying one desired set of settings image data, and selecting the desired set of settings image data from the storage portion, the settings image data editing portion editing the selected set of settings image data.

6. An image forming device as claimed in claim 5, further comprising an identification data storing portion storing a plurality of sets of identification data in one to one correspondence with the plurality of sets of settings image data,
   wherein the edit image data providing portion includes a determining portion receiving a set of identification data, via the communicating portion from the network, and referring to the identification data storing portion to determine whether the received identification data set matches an identification data set that corresponds to the desired set of settings image data specified by the selection instruction, the edit image data providing portion providing the edit image data to the network when the determining portion determines that the identification data sets match.

7. An image forming device as claimed in claim 2, further comprising:
   a displaying portion sequentially displaying, in a predetermined order, the plurality of setting items that can be included in the settings image data; and
   a setting portion setting whether to include, in the settings image, each setting item displayed by the displaying portion, and
   wherein the settings image data editing portion edits the settings image to include therein those setting items that have been set by the setting portion to be included in the settings image.

8. A network system comprising:
   a network;
   an image forming device including:
      a communicating portion connected to the network and capable of performing bi-directional communications; and
   a personal computer including:
      a communicating device connected to the network and capable of performing bi-directional communications;
      a display device displaying an image based on image data received from the image forming device via the communicating device;
      an instruction inputting portion enabling a user to input various instructions; and
      a transmitting portion controlling the communicating device to transmit the instructions inputted via the instruction inputting portion to the image forming device via the network,
   wherein the image forming device further includes:
      an image forming portion forming images based on image data, the image forming portion having a plurality of functions;
      a storage portion storing settings image data, the settings image data indicating a settings image that lists at least one setting item among a plurality of setting items, the plurality of setting items corresponding to the plurality of functions possessed by the image forming portion, respectively;
      an edit image data providing portion controlling the communicating portion to provide via the network the personal computer with edit image data, the edit image data indicating an edit image that enables a user to identify at least one setting item desired to be listed in the settings image from among the plurality of setting items;
      a settings image data editing portion receiving, from the personal computer via the network and the communicating portion, an edit instruction that the user inputs in the instruction inputting portion in association with the edit image and that indicates at least one setting item identified by the user, and editing the settings image data, based on the edit instruction, to include only the at least one setting item identified by the user in the settings image and to exclude at least one setting item not identified by the user from the settings image, the settings image data editing portion updating the settings image data stored in the storage portion with the edited settings image data; and
      a settings image data providing portion controlling the communicating portion to provide the network with the settings image data edited by the settings image data editing portion, the edited settings image data indicating an edited settings image that lists only the at least one setting item identified by the user among the plurality of setting items, the at least one setting item listed in the edited settings image being used for performing settings related to the corresponding at least one function possessed by the image forming portion, the edited settings image enabling the user to perform settings related to the at least one function corresponding to the at least one setting item identified by the user,
   wherein the transmitting portion in the personal computer controls the communicating device to transmit to the image forming device a request to send the edit image data when the instruction inputting portion receives the user's request to edit the settings image, the edit image data providing portion in the image forming device controlling the communicating portion to transmit the edit image data to the personal computer upon receipt of the request, the display device in the personal computer displaying the edit image based on the edit image data, and
   wherein the transmitting portion in the personal computer controls the communicating device to transmit to the image forming device the edit instruction that the user inputs in the instruction inputting portion while viewing the edit image on the displaying device.

9. A network system as claimed in claim 8, wherein the edit image data is indicative of the edit image that enables the user to identify a setting item desired to be included in the settings image, and wherein the settings image data editing portion edits the settings image data based on the edit instruction by including only the user's identified setting item in the settings image and by excluding the user's non-identified setting item from the settings image.

10. A network system as claimed in claim 9, wherein the edit image data includes settings item inclusion-setting data, the display device in the personal computer displaying the edit image including a setting-item inclusion-setting portion based on the settings item inclusion-setting data, the instruction inputting portion receiving the user's setting-item inclusion setting instruction indicating his/her desire whether or not to include, in the settings image, a setting item used for performing a setting for each of the plurality of functions, and wherein the settings image data editing portion receives the setting-item inclusion setting instruction, and edits, based on the setting-item inclusion setting instruction, the settings image data to selectively include the setting item for each function in the settings image.

11. A network system as claimed in claim 9, wherein the edit image data includes layout setting data, the display device in the personal computer displaying the edit image including a layout setting portion based on the layout setting data, the instruction inputting portion receiving the user's layout setting instruction indicating his/her desired arrangement how the setting item for each of the plurality of functions is to be selectively arranged in the settings image, and wherein the settings image data editing portion receives the layout setting instruction, and edits, based on the layout setting instruction, determines an arrangement how the setting item for each function is to be selectively arranged in the settings image.

12. A network as claimed in claim 11, wherein the instruction inputting portion enables the user to input, into the layout setting portion, his/her desired setting items in an order desired to be arranged in the settings image.

13. A network as claimed in claim 11, wherein the instruction inputting portion enables the user to input, into the layout setting portion, arrangement data indicative of his/her desired arrangement, in which his/her desired setting item is to be arranged in the settings image.

14. A network system as claimed in claim 9, wherein the personal computer includes a plurality of personal computers, a plurality of sets of identification data being assigned to the plurality of personal computers, wherein the storage portion stores a plurality of sets of settings image data in one to one correspondence with the plurality of computers; and wherein the image forming device further comprises:

a selecting portion receiving, from one personal computer via the network, a selection instruction specifying one desired set of settings image data, and selecting the desired set of settings image data from the storage portion, and an identification data storing portion storing a plurality of sets of identification data in one to one correspondence with the plurality of sets of settings image data, wherein the edit image data providing portion includes a determining portion receiving a set of identification data, from the personal computer via the network, and referring to the identification data storing portion to determine whether the received identification data set matches an identification data set that corresponds to the desired set of settings image data specified by the selection instruction, the edit image data providing portion providing the edit image data to the personal computer when the determining portion determines that the identification data sets match.

* * * * *